United States Patent
Shimizu et al.

(10) Patent No.: US 6,549,226 B1
(45) Date of Patent: Apr. 15, 2003

(54) OPTICAL PRINTER HEAD

(75) Inventors: Yukihiko Shimizu, Mobara (JP); Toshiaki Nakahara, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 09/542,936

(22) Filed: Apr. 4, 2000

(30) Foreign Application Priority Data

Apr. 16, 1999 (JP) .............................. 11-109667

(51) Int. Cl.⁷ .............................. B41J 27/00; B41J 15/14
(52) U.S. Cl. ...................................... 347/241; 347/256
(58) Field of Search ........................... 367/238, 241, 367/232, 256; 349/10; 250/226; 359/129, 839

(56) References Cited

U.S. PATENT DOCUMENTS

| | | | |
|---|---|---|---|
| 4,870,268 A | * 9/1989 | Vincent et al. | 250/226 |
| 5,923,358 A | * 7/1999 | Yamakawa | 347/238 |
| 6,049,364 A | * 4/2000 | Takahara et al. | 349/10 |

FOREIGN PATENT DOCUMENTS

JP 6-278314 * 10/1994 .............. B41J/2/44

OTHER PUBLICATIONS

U.S. patent application Ser. No. 09/532,865, filed Mar. 22, 2000, pending.
U.S. patent application Ser. No. 09/542,936, filed Apr. 4, 2000, pending.
U.S. patent application Ser. No. 09/542,936, Apr. 4, 2000, pending.
U.S. patent application Ser. No. 09/597,578, Jun. 20, 2000, pending.

* cited by examiner

*Primary Examiner*—Hai Pham
(74) *Attorney, Agent, or Firm*—Oblon, Spivak, McClelland, Maier & Neustadt, P.C.

(57) ABSTRACT

An optical printer head capable of providing a distinct image free of color shade and color fading. Dot-like lights different in luminous color emitted from a plurality of fluorescent luminous tubes acting as light sources are guided to a common equi-magnification image formation element through a dichroic optical element while being kept from being aligned or coincident with each other, to thereby carry out image formation on a record medium while being arranged in predetermined positional relationship thereon. Also, optical members may be incorporated in the optical printer head, so that optical path lengths of the dot-like lights different in luminous color may be rendered substantially equal to each other.

6 Claims, 6 Drawing Sheets

MAIN SCANNING DIRECTION

SUB-SCANNING DIRECTION

MAIN SCANNING DIRECTION

SUB-SCANNING DIRECTION

OPTICAL PRINTER HEAD

BACKGROUND OF THE INVENTION

This invention relates to an optical printer head, and more particularly to an optical printer head in which a plurality of luminous elements are incorporated to form an image or the like on a record medium.

Now, a conventional optical printer head in which fluorescent luminous tubes are incorporated as light sources will be described with reference to FIG. 5. The optical printer head generally designated at reference numeral 101 in FIG. 5 is arranged in the form of a write head for a fluorescent printer in a housing (not shown). The housing is provided therein with a silver salt sheet 20 in a manner to be opposite to the optical printer head 101. The silver salt sheet 20 may be constituted by a silver salt paper or a silver salt developing paper. The silver salt sheet 20 and optical printer head 101 are moved relative to each other in a sub-scanning direction or in a lateral direction in FIG. 5.

The optical printer head 101 includes three fluorescent luminous tubes 100R, 100G and 100B, which are constructed so as to emit dot-like lights of red, green and blue luminous colors from anodes 30R, 30G and 30B thereof, respectively. The anodes 30R, 30G and 30B each are constituted of a plurality of luminous dots arranged in a row or in an offset manner at predetermined intervals in a direction normal to the sheet of FIG. 5. Thus, the luminous dots of each of the fluorescent luminous tubes 100R, 100G and 100B are arranged in a main scanning direction, whereas the three fluorescent luminous tubes 100R, 100G and 100B are arranged side by side in the sub-scanning direction of the silver salt sheet 20. The printer head 101 also includes image formation elements of equi-magnification (hereinafter referred to as "equi-magnification image formation elements") 40 respectively provided for the fluorescent luminous tubes 100R, 100G and 100B and color filters 50R, 50G and 50B provided in correspondence to the respective fluorescent luminous tubes 100R, 100G and 100B and therefore the respective luminous colors. The image formation elements 40 and color filters 50R, 50G and 50B are arranged outside the fluorescent luminous tubes 100R, 100G and 100B, respectively. Three kinds of lights emitted from the luminous dots of the fluorescent luminous tubes 100R, 100G and 100B pass through the equi-magnification image formation elements 40 and color filters 50R, 50G and 50B and then are irradiated on the silver salt sheet 20, respectively.

In the conventional optical printer head 101 thus constructed, a color image is subject to color separation, to thereby provide color data on the respective colors, resulting in the fluorescent luminous tube 100R, 100G and 100B being driven by means of the color data corresponding thereto. In synchronism with such driving of the fluorescent luminous tubes 100R, 100G and 100B, the optical printer head 101 and silver salt sheet 20 are moved relative to each other in the sub-scanning direction or in the lateral direction in FIG. 5, to thereby permit dot-like light emitted from each of the fluorescent luminous tubes 100R, 100G and 100B to be irradiated on the silver salt sheet 20, resulting in a latent image being formed thereon. Then, the latent image is developed, resulting in the original color image being reproduced on the silver salt sheet 20.

The conventional optical printer head 101, as described above, is constructed so as to be moved relative to the developing paper. Such construction causes the optical printer head to require a large space, so that it is substantially impossible to form the optical printer head into a small size.

Also, in the conventional optical printer head 101, it is required to accurately align lights of three colors respectively emitted from the fluorescent luminous tubes 100R, 100G and 100B with each other on the developing paper. However, the alignment is affected by optical distortion of the equi-magnification image formation elements 40 with an increase in resolution and an increase in length of the paper, so that it is substantially difficult to attain uniform alignment of the lights over a whole width of the paper. More specifically, the equi-magnification image formation elements 40 each are formed by accumulating a plurality of bar-like lenses. Disturbance in array of the lenses causes linearity of a luminous pattern and a whole pitch thereof to be varied, leading to a variation in properties of the equi-magnification image formation element 40 depending on the element 40.

Such a variation in properties of the equi-magnification image formation elements 40 for the respective fluorescent luminous tubes 100A, 100G and 100B, even when the luminous dots or anodes 30R, 30G and 30B of the fluorescent luminous tubes 100R, 100B and 100G are uniformly arranged in juxtaposition to each other with predetermined accuracy as shown in FIG. 6, fails to permit lights of the luminous dots which permeate through the image formation elements 40 to form an image in a desired manner on the developing paper or solver salt sheet 20. Thus, an attempt to drive the fluorescent luminous tubes at predetermined timings by means of an image signal obtained by color separation to superpose dot-like lights of the respective colors on each other on the developing paper, to thereby reproduce the original color image on the developing paper results in a failure because the dot-like lights fail to be aligned with each other on the developing paper, as shown in FIG. 6.

SUMMARY OF THE INVENTION

The present invention has been made in view of the foregoing disadvantage of the prior art.

Accordingly, it is an object of the present invention is to provide an optical printer head which is capable of permitting lights emitted from a plurality of light sources to form an image on a record medium while being arranged in fixed positional relationship on the record medium, resulting in a distinct image free of color shift and color fading being formed on the record medium.

In accordance with the present invention, an optical printer head is provided. The optical printer head includes a plurality of light sources, an optical element for discharging lights introduced thereinto from said light sources in a predetermined direction therefrom while keeping axes of the lights in proximity to each other, and an image formation element of equi-magnification (hereinafter referred to as "equi-magnification image formation element") for introducing the lights discharged from the optical element thereinto.

The light sources incorporated in the optical printer head of the present invention may include at least two selected from the group consisting of a first light source for emitting light in a predetermined direction, a second light source for emitting light in a direction opposite to the first light source and a third light source for emitting light in a direction perpendicular to the first and second light sources. The optical element may be constituted by either a dichroic optical element which reflects light at a predetermined wavelength of lights emitted from the light sources and permits lights at the other wavelengths to permeate therethrough or a total reflection mirror which reflects lights emitted from the light sources. Also, the optical printer head of the present invention may also include optical members arranged in proximity to the optical element so as to permit optical path lengths of the lights of the light sources in the optical element to be substantially equal to each other. Alternatively, the optical printer head of the present invention may further include a light absorbing member arranged in proximity to the optical element so as to absorb light other than lights introduced from the light sources into the optical element.

Further, the optical printer head of the present invention may be so constructed that at least one of the light sources may be combined with an optical filter. Alternatively, the light sources each may be a monochromatic light source constituted by a combination of an optical filter which permits light at a predetermined wavelength to permeate therethrough and a fluorescent luminous tube or may contain at least one different luminous color.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described in detail with reference to FIGS. 1 to 4.

An optical printer head according to the present invention includes a plurality of light sources. However, a single equi-magnification image formation lens array (selfoc lens array) or a single set of equi-magnification image formation lens arrays is arranged so as to be common to the light sources. Lights emitted from the light sources are introduced into the common equi-magnification image formation lens array by means of a specific optical element, during which optical axes of the lights from the light sources are kept from being aligned or coincident with each other. This permits the lights which are emitted from the light sources and then permeate through the single equi-magnification image formation lens array to form an image on a record medium while being arranged in fixed positional relationship to each other on the record medium. Suitable adjustment of luminous timings of the light sources and relative movement between the printer head and the record medium permits the lights to form an image on the record medium while being superposed on each other on the record medium.

Alignment of the optical axes of the lights with each other requires a combination of reflection of the lights by the optical element and permeation of the lights through the optical element. However, permeation of the lights through the optical element tends to cause an increase in loss of light quantity as compared with only reflection of the lights by the optical element. Thus, a combination of such reflections exhibits an advantage of reducing loss of light quantity.

Four embodiments of the present invention described hereinafter each have a plurality of light sources different in luminous color incorporated therein. Also, in each of the embodiments, a dichroic optical element is incorporated so as to act as the optical element. Two or three such light sources are arranged in each of the embodiments.

Figure 1:
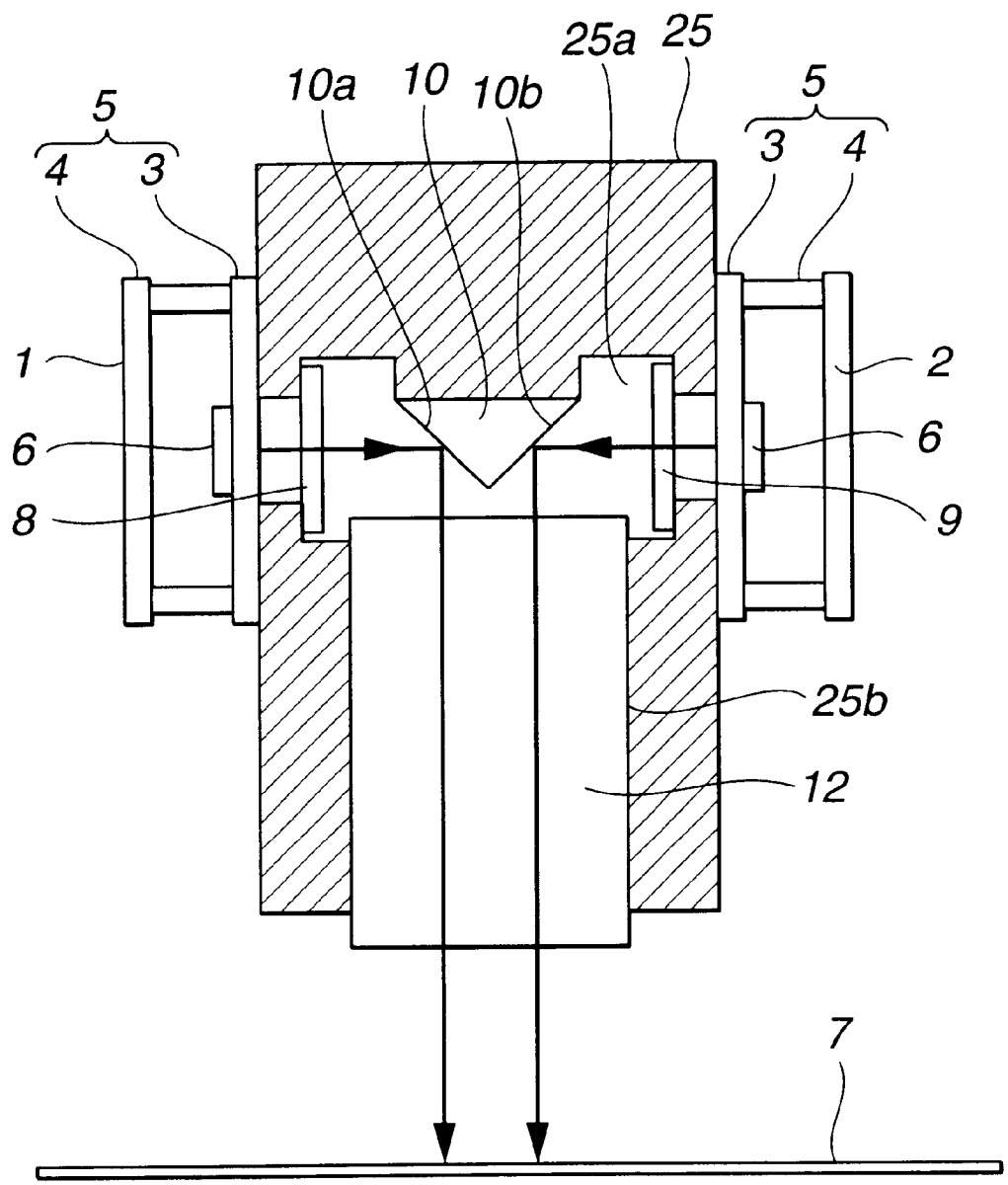
FIG. 1 is a sectional view showing a first embodiment of an optical printer head according to the present invention.
Figure 1:
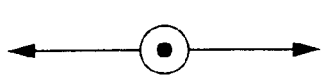

Referring first to FIG. 1, an embodiment of an optical printer head according to the present invention is illustrated. An optical printer head of the illustrated embodiment includes a first fluorescent luminous tube 1 arranged so as to emit light in a predetermine direction and acting as a first light source, as well as a second fluorescent luminous tube 2 arranged opposite to the first fluorescent luminous tube 1 so as to emit light in a direction opposite to that of the light emitted from the first fluorescent luminous tube 1 while being kept parallel to the light of the first fluorescent luminous tube 1. The second fluorescent luminous tube 2 acts as a second light source.

In the illustrated embodiment, the fluorescent luminous tubes 1 and 2 each include an envelope 5 formed by sealedly joining an anode substrate 3 made of glass to a box-like casing 4. The anode substrate 3 is formed on a portion thereof positioned in the envelope 5 with a light-permeable anode conductor and a phosphor deposited on the anode conductor, which cooperate with each other to provide an anode 6. The anode 6 is constructed in the form of a plurality of luminous dots arranged in a row or in an offset manner at predetermined intervals in a direction normal to the sheet of FIG. 1. In the illustrated embodiment, the luminous dots are arranged in a row. Also, in the illustrated embodiment, the direction in which the luminous dots are arranged is defined to be a main scanning direction and the fluorescent luminous tubes 1 and 2 are arranged in a sub-scanning direction of a record medium 7.

The first fluorescent luminous tube 1 has a ZnO:Zn phosphor incorporated therein. The ZnO:Zn phosphor is a zinc oxide phosphor which has a wide luminous spectrum and exhibits a luminous color within a range between a blue color and a red color. Also, a filter 8 of a green color is arranged for the fluorescent luminous tube 1, to thereby provide a green luminous color. When a blue filter is used, a blue luminous color is provided.

The second fluorescent luminous tube 2 has a $(Zn_{1-x},Cd_x)$S:Ag,Cl phosphor which is a (Zn,Cd)S phosphor incorporated therein, because a ZnO:Zn phosphor fails to exhibit sufficient energy in a red region in view of sensitive characteristics of a photosensitive layer (for example, a cyan layer) photosensitized at a red color in a silver salt sheet acting as the record medium 7. The $(Zn_{1-x},Cd_x)$S:Ag,Cl phosphor has been commonly used for a fluorescent display device, because it has an x value of between 0.75 and 0.80 and has a peak wavelength of between 650 nm and 660 nm, resulting in exhibiting a reddish to orange luminous color. Also, a red filter 9 is provided for the second fluorescent luminous tube 2, so that it may exhibit a red luminous color.

The optical printer head of the illustrated embodiment also includes an optical element 10 arranged between the first fluorescent luminous tube 1 including the filter 8 and the second fluorescent luminous tube 2 including the filter 9. The optical element 10 functions to reflect lights emitted from the first and second fluorescent luminous tubes 1 and 2 and then guide the reflected lights to a common equi-magnification image formation element (selfoc lens array) 12 while keeping optical axes of the lights parallel to each other and preventing the optical axes from being coincident with each other. In the illustrated embodiment, the optical element 10 is constituted by a dichroic optical element which is formed into a prism-like configuration and of which two faces each act as a dichroic mirror (filter). Also, the equi-magnification image formation element 12 incorporated in the illustrated embodiment is an optical system formed by integrating a plurality of refractive index distribution type lenses with each other so as to provide a single continuous real image of equi-magnification. Thus, the equi-magnification image formation element 12 carries out a function like a spherical lens which permits light to meander at a constant cycle with a continuous variation in refractive index in the lens, to thereby reproduce an erecting equi-magnification real image increased in resolution.

The first and second fluorescent luminous tubes 1 and 2, optical element 10 and equi-magnification image formation element (selfoc lens array) 12 are mounted in such a posture and positional relationship as described above on a holder 25 constituted by a base of the printer head. The holder 25 is constructed in the form of a hollow member and formed therein with a light guide space or hole 25a in a manner to communicate with the fluorescent luminous tubes 1 and 2 on both sides of the holder 25 on which the fluorescent luminous tubes are mounted. The light guide hole 25a is mounted therein with the optical element 10 so as to be positioned at a central portion thereof. Also, the holder 25 is formed therein with a mount hole 25b which permits the light guide hole 25b to communicate with a lower surface of the holder 25 therethrough. The equi-magnification image formation element (selfoc lens array) 12 is mounted in the mount hole 12.

As shown in FIG. 1, dot-like light of a green or blue color emitted from the first fluorescent luminous tube 1 is reflected by a first reflecting surface 10a of the dichroic optical element 10 which selectively exhibits a function of reflecting light or permitting the light to permeate therethrough depending on a wavelength of the light, resulting an optical path of the light being changed in a downward direction by an angle of 90 degrees, after it passes through the filter 8. Color components of the light emitted from the first fluorescent luminous tube 1 other than a green or blue component thereof are allowed to permeate through the reflecting surface 10a, to thereby be separated from the green or blue component.

Dot-like light of a red luminous color emitted from the second fluorescent luminous tube 2, as shown in FIG. 1, is reflected by a second reflecting surface 10b of the dichroic optical element 10 which selectively carries out a light reflecting function depending on a wavelength of the light, resulting-in an optical path of the light being downwardly changed by 90 degrees, after it passes through the filter 9. Components of the light other than a red luminous component thereof are removed by the filter 9 and then permitted to permeate through the second reflecting surface 10b without being reflected thereby.

In the illustrated embodiment, the green and red dichroic optical element 10 is used for both lights of green and red colors from the fluorescent luminous tubes 1 and 2, therefore, it is not necessarily required to arrange the green and red filters 8 and 9. Also, when the filters 8 and 9 are arranged, a total reflection mirror may be used as the optical element.

The holder 25 in which the optical element 10 and equi-magnification image formation element 12 are mounted may be formed on an inner surface thereof or the like with a light absorbing film. The light absorbing film may be made of a black acrylic paint. However, it may be made of any other suitable material so long as it absorbs light. The light absorbing film functions to absorb unnecessary light passing through the reflecting surface of the optical element. Thus, the light absorbing film prevents the unnecessary light from being reflected by the inner surface of the holder 25, leading to a reduction in contrast.

In the illustrated embodiment, the dot-like lights different in color emitted from the first and second fluorescent luminous tubes 1 and 2 are then incident on the common equi-magnification image formation element 12 without keeping optical axes thereof aligned or coincident with each other while being rendered parallel to each other, resulting in forming an image on the record medium while being arranged in the sub-scanning direction. The dot-like lights emitted from the fluorescent luminous tubes are irradiated on the record medium 7 through the equi-magnification image formation element 12, so that arrangement of the dot-like lights may be constant. Thus, suitable adjustment of luminous timings of the light sources and relative movement between the printer head and the record medium in view of positional relationship between images to be formed permits the lights from the light sources to be accurately superposed on each other on the record medium 7, so that the illustrated embodiment provides an image significantly distinct as compared with the prior art.

In the illustrated embodiment, the two fluorescent luminous tubes 1 and 2 different in luminous color from each other are incorporated. Alternatively, two fluorescent luminous tubes having the same luminous color may be incorporated. Such construction may be employed when it is desired to obtain a plain color increased in intensity.

In the illustrated embodiment, the lights emitted from the fluorescent luminous tubes are immediately synthesized together on the record medium. Thus, it is not required to carry out pattern formation of the luminous dots of the anode on the same position.

Figure 2:
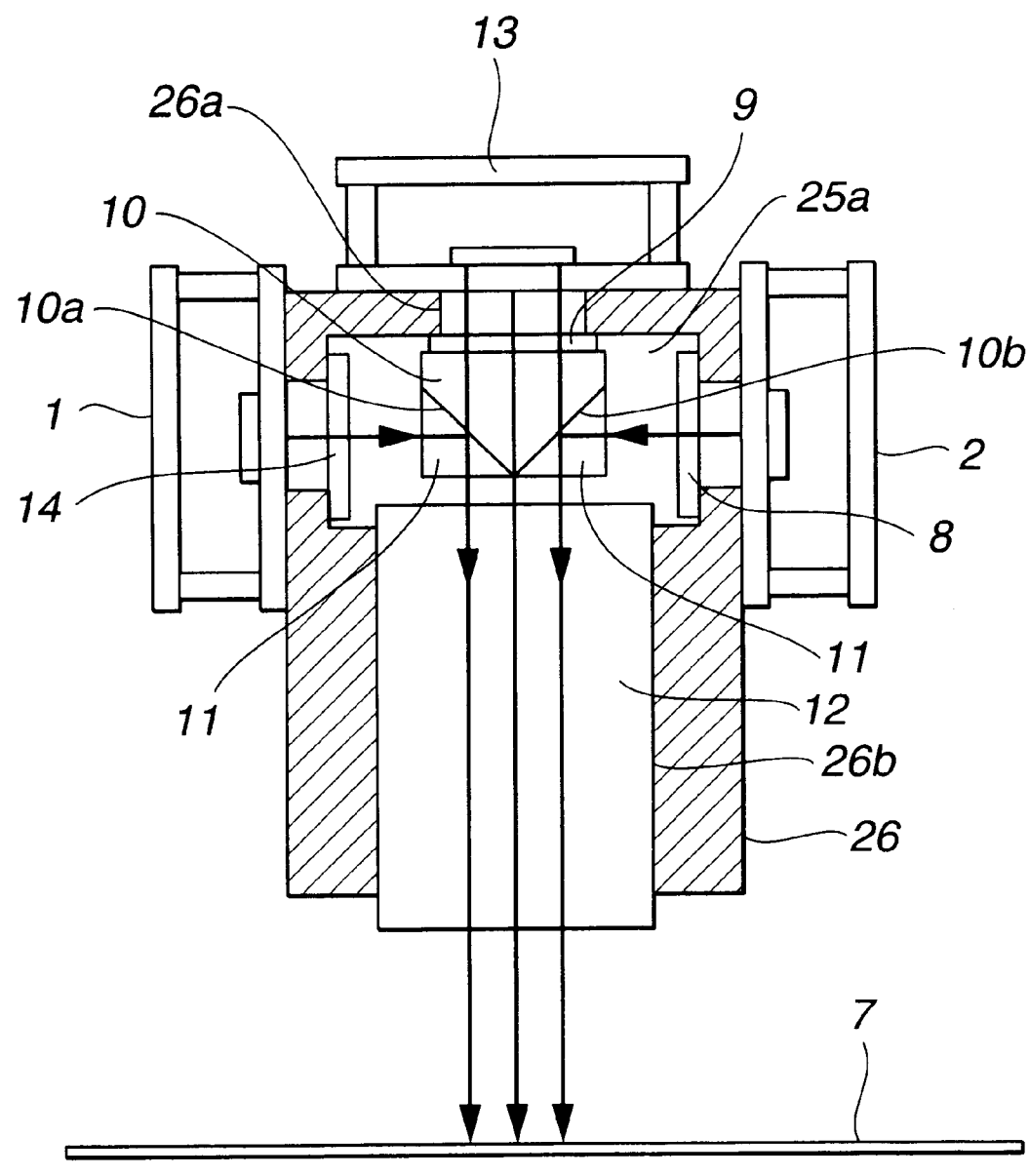
FIG. 2 is a sectional view showing a second embodiment of an optical printer head according to the present invention.
Figure 2:
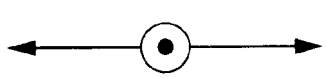

Referring now to FIG. 2, another or a second embodiment of an optical printer head according to the present invention is illustrated. An optical printer head of the illustrated embodiment includes a first fluorescent luminous tube 1 acting as a first light source for emitting light in a predetermined direction, a second fluorescent luminous tube 2 arranged so as to be opposite to the first fluorescent luminous tube 1 and acting as a second light source for emitting light in a direction parallel to the light emitted from the first fluorescent tube 1 and opposite thereto, and a third fluorescent luminous tube 13 acting as a third light source for emitting light in a direction perpendicular to the lights emitted from the first fluorescent luminous tube 1 and second fluorescent luminous tube 2.

The first fluorescent luminous tube 1 includes a ZnO:Zn phosphor and a blue (B) filter 14, to thereby emit dot-like light of a blue color therefrom. The second fluorescent luminous tube 2 includes a ZnO:Zn phosphor and a green (G) filter 8, to thereby emit dot-like light of a green color therefrom. The third fluorescent luminous tube 13 includes a (Zn,Cd)S phosphor and a red (R) filter 9, resulting in emitting dot-like light of a red color therefrom. The fluorescent luminous tubes may be constructed into the same structure as those in the first embodiment described above.

The first, second and third fluorescent luminous tubes 1, 2 and 13 respectively including the filters 14, 8 and 9 are mounted at predetermined locations on a holder 26 which is constructed so as to permit the fluorescent luminous 1, 2 and 13 tubes to be arranged in such a posture and positional relationship as described above. The holder 26 is mounted on an upper surface thereof with the third fluorescent luminous tube 13. The holder 26 is formed therein with a communication hole 26a so as to be positioned right below the third fluorescent luminous tube 13, to thereby communicate with the third fluorescent luminous tube 13. Also, the holder 26 is formed therein with a light guide hole 25a so as to be positioned below the communication hole 26a, resulting in communicating with the communication hole 26a and the first and second fluorescent luminous tubes 1 and 2, so that lights emitted from the first and second fluorescent luminous tubes 1 and 2 may be guided into the holder 26 through the light guide hole 25a. The light guide hole 25a is provided therein with the filters 8, 9 and 14 and the optical element 10. The holder 26 is formed at a lower portion thereof with a mount hole 26b so as to communicate with the light guide hole 25a and an exterior of the holder 26. The mount hole 26b of the holder 26 is provided therein with a common equi-magnification image formation element (selfoc lens array) 12.

As shown in FIG. 2, dot-like light emitted from the first fluorescent luminous tube 1 is reflected by a first reflecting surface 10a of the dichroic optical element 10 which selectively exhibits a function of reflecting light and permitting the light to permeate therethrough depending on a wavelength of the light, resulting in an optical path of the light being changed in a downward direction by an angle of 90 degrees, after it passes through the filter 14. Color components of the light emitted from the first fluorescent luminous tube 1 other than a blue component thereof are caused to permeate through the reflecting surface 10a without being reflected thereby.

Dot-like light emitted from the second fluorescent luminous tube 2, as shown in FIG. 2, is reflected by a second reflecting surface 10b of the dichroic optical element 10 which selectively carries out a reflecting function depending on a wavelength of the light, resulting in an optical path of the light being downwardly changed by 90 degrees, after it passes through the filter 8. Components of the light other than a green luminous component thereof are caused to permeate through the reflecting surface 10b of the optical element 10 without being reflected thereby.

Also, dot-like light of a red color emitted from the third fluorescent luminous tube 13 is permitted to downwardly pass through the dichroic optical element 10 after it permeates through the filter 9.

Thus, the lights emitted from the three fluorescent luminous tubes 1, 2 and 13 respectively including the filters 14, 8 and 9 are reflected by the dichroic optical element 10 or permeate therethrough and then downwardly travel while optical axes of the lights are kept parallel to each other and kept from being aligned or coincident with each other. Then, the lights are introduced into the common equi-magnification image formation element (selfoc lens array) 12.

The equi-magnification image formation element 12 and optical element 10 in the illustrated embodiment may be constructed in substantially the same manner as those in the first embodiment described above, except design factors or requirements for application of them to the three fluorescent luminous tubes 1, 2 and 13. Thus, they exhibit substantially the same function as those in the first embodiment.

In the illustrated embodiment, the dot-like lights different in color emitted from the first, second and third fluorescent luminous tubes 1, 2 and 13 are then incident on the common equi-magnification image formation element 12 without keeping optical axes thereof aligned with each other while being rendered parallel to each other, resulting in forming an image on a record medium 7 while being in proximity to each other.

Thus, the dot-like lights emitted from the fluorescent luminous tubes 1, 2 and 13 are irradiated on the record medium 7 through the common equi-magnification image formation element (selfoc lens array) 12, so that the dot-like lights may be arranged in fixed positional relationship on the record medium 7 while being kept from being aligned or coincident with each other. Thus, suitable adjustment of luminous timings of the light sources and relative movement between the printer head and the record medium in view of the positional relationship permits the lights from the light sources to be accurately superposed on each other at any desired position on the record medium 7, so that the illustrated embodiment provides a significantly distinct image of desired colors.

A color image is subject to color separation, resulting in color data on red (R), green (G) and blue (B) colors being obtained, so that the fluorescent luminous tubes 1, 2 and 13 are driven by means of the color data corresponding thereto. In synchronism with the driving, the optical printer head and record medium 7 are moved relative to each other in the sub-scanning direction or the lateral direction in FIG. 2, so that dot-like lights emitted from the fluorescent luminous tubes 1, 2 and 13 are irradiated on the record medium 7, resulting in a latent image being formed thereon. Then, the latent image is developed, so that the original image may be reproduced on the record medium 7.

In the illustrated embodiment, the three fluorescent luminous tubes 1, 2 and 13 different in luminous color from each other are incorporated. Alternatively, three fluorescent luminous tubes emitting light of the same luminous color may be incorporated. Such construction may be employed when it is desired to obtain a plain color increased in intensity. Also, in the illustrated embodiment, the dichroic optical element is incorporated. Thus, when two of the three fluorescent luminous tube are constructed so as to emit light of the same luminous color and the other emits light of a different luminous color, it is required to permit the first and second fluorescent luminous tubes 1 and 2 arranged opposite to each other to exhibit the same luminous color and the third fluorescent luminous tube 13 to exhibit the different luminous color.

Further, in the illustrated embodiment, it is required that the lights which are emitted from the first and second fluorescent luminous tubes 1 and 2, reflected by the reflecting surfaces 10a and 10b of the optical element 10 and then incident on the equi-magnification image formation element 12 each have the same optical path length as the light from the third fluorescent luminous tube 13 which is incident on the equi-magnification image formation lens 12 through the optical element 10. This may be attained by adjusting a position of the holder 26 at which the third fluorescent luminous tube 13 is mounted, when the first fluorescent luminous tube 1 and second fluorescent luminous tube 2 are previously mounted at predetermined positions on the holder 26.

In addition, in the illustrated embodiment, light emitted from the third fluorescent luminous tube 13 which is permitted to permeate through the dichroic optical element 10 is increased in loss of light quantity as compared with the lights emitted from the first and second fluorescent luminous tubes 1 and 2 and then reflected by the first and second reflecting surfaces 10a and 10b of the dichroic optical element 10. Thus, the third fluorescent luminous tube 13 is preferably constructed so as to emit light at maximum intensity.

The optical printer head of the illustrated embodiment, as shown in FIG. 2, further includes prism-like optical members 11 respectively arranged in proximity to the first reflecting surface 10a and second reflecting surface 10b of the dichroic optical element 10.

Such construction of the illustrated embodiment permits light emitted from the first fluorescent luminous tube 1 to permeate through the optical member 11 and then be reflected by the first reflecting surface 10a of the dichroic optical element 10, resulting in the light being outwardly discharged through the optical member 11. Light emitted from the second fluorescent luminous tube 2 is permitted to permeate the optical member 11 and then be reflected by the second reflecting surface 10b of the dichroic optical element 10, to thereby be outwardly discharged through the optical member 11. Light emitted from the third fluorescent luminous tube 13 is permitted to permeate through the dichroic optical element 10, to thereby be outwardly discharged.

Thus, the lights emitted from the first fluorescent luminous tube 1 and second fluorescent luminous tube 2 permeate through only the optical member 11 and the light emitted from the third fluorescent luminous tube 13 permeates through only the dichroic optical element 10. Also, the above-described construction of the illustrated embodiment causes a distance by which the light emitted from each of the first and second fluorescent luminous tubes 1 and 2 travels through the optical member 11 to be different from that by which the light from the third fluorescent luminous tube travels through the dichroic optical element 10. However, in the illustrated embodiment, the optical members 11 each have a refractive index and dimensions suitably set in view of the dichroic optical element 10, so that an optical path length of the light emitted from each of the first and second fluorescent luminous tubes 1 and 2 may be rendered substantially equal to that of the light from the third fluorescent luminous tube 13. Thus, although the above-described construction of the illustrated embodiment fails to permit the first and second fluorescent luminous tubes 1 and 2 to be arranged with respect to the equi-magnification image formation element 12 in the same manner as the third fluorescent luminous tube 13, it permits the optical path length of the light emitted from each of the first and second fluorescent luminous tubes 1 and 2 to be substantially identical with that of the light from the third fluorescent luminous tube 13. This results in positions (focal positions) at which the dot-like lights from the first, second and third fluorescent luminous tubes 1, 2 and 13 form an image being identical with each other, so that the lights each may form an image under the same conditions on the record medium 7.

As described above, setting of the focal positions of the fluorescent luminous tubes 1 and 2 and fluorescent luminous tube 13 on the record medium 7 while keeping predetermined positional relationship therebetween may be attained by positioning one of the first and second fluorescent luminous tubes 1 and 2 and the third fluorescent luminous tube 13 with respect to the optical element 10 and optical members 11 and then moving the position of the other fluorescent luminous tube(s) in all directions along an optical path thereof, to thereby ensure image formation on the record medium 7 and suitable positional relationship among the images formed.

The optical element 10 and optical members 11 each are made of borosilicate crown glass (BK:7, Shot Glass Welke® in German), to thereby have a refractive index of 1.52 which is substantially equal to that of soda-lime glass generally used for a fluorescent luminous tube. When an optical member and a fluorescent luminous tube joined to each other have substantially the same refractive index, refraction of light at a joint therebetween is hard to occur, to thereby prevent attenuation of the light and the like.

Figure 3:
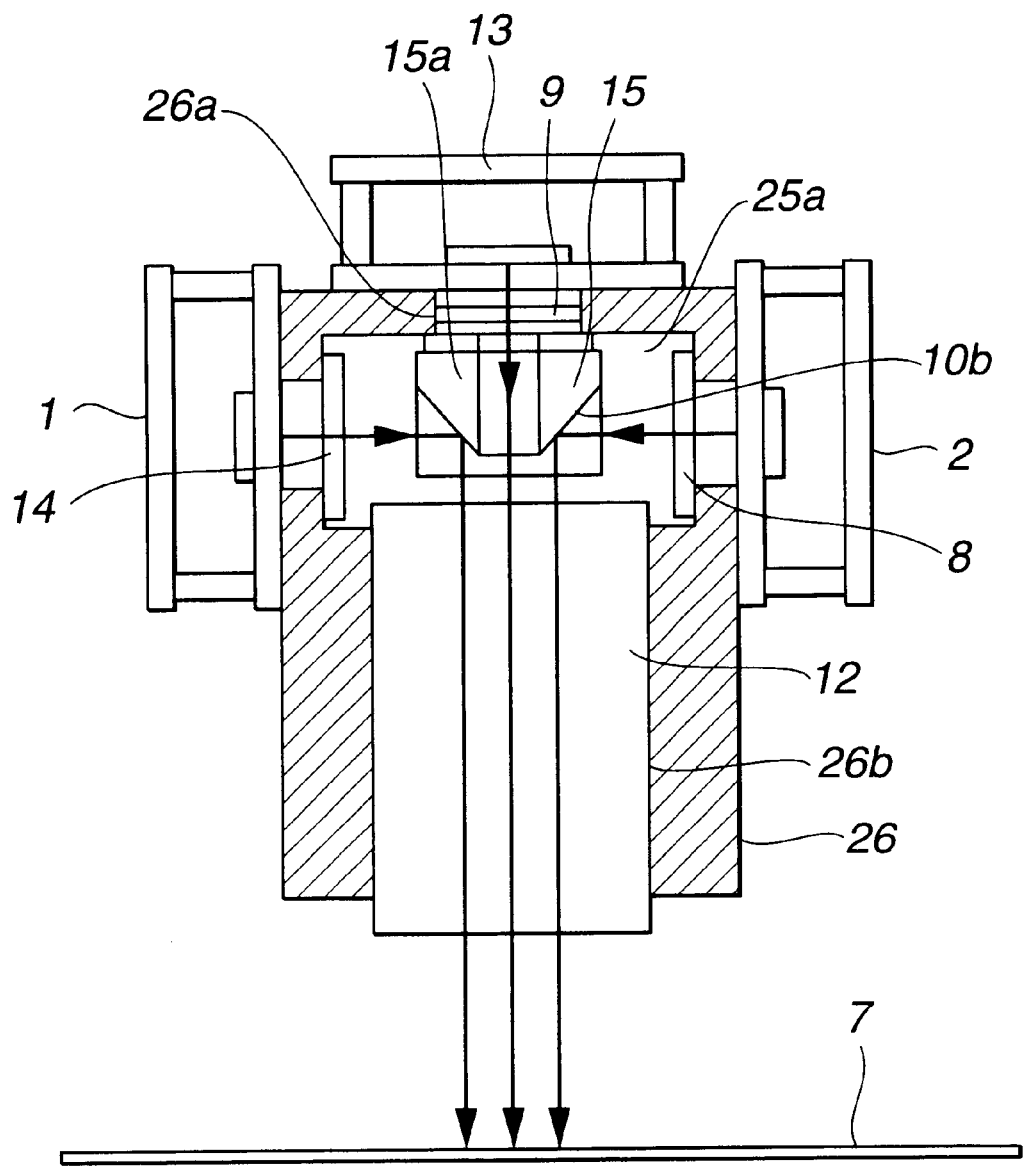
FIG. 3 is a sectional view showing a third embodiment of an optical printer head according to the present invention.

Referring now to FIG. 3, a further or third embodiment of an optical printer head according to the present invention is illustrated. In the illustrated embodiment, an optical element 15 is formed with a through-hole 15a vertically extending therethrough, so that light emitted from a third fluorescent luminous tube 13 may pass via the through-hole 15a without permeating through the optical element 15, resulting in being incident on an equi-magnification image formation element 12. The remaining part of the third embodiment may be constructed in substantially the same manner as the second embodiment described above. An optical path length of light from each of first and second fluorescent luminous tubes 1 and 2 and the third fluorescent luminous tube 13 may be adjusted in substantially the same manner as in the second embodiment. Also, selection of luminous colors of the fluorescent luminous tubes may be carried out in substantially the same way as in the second embodiment. In the illustrated embodiment, a filter 9 is mounted in a communication hole 26a of a holder 26.

Figure 4:
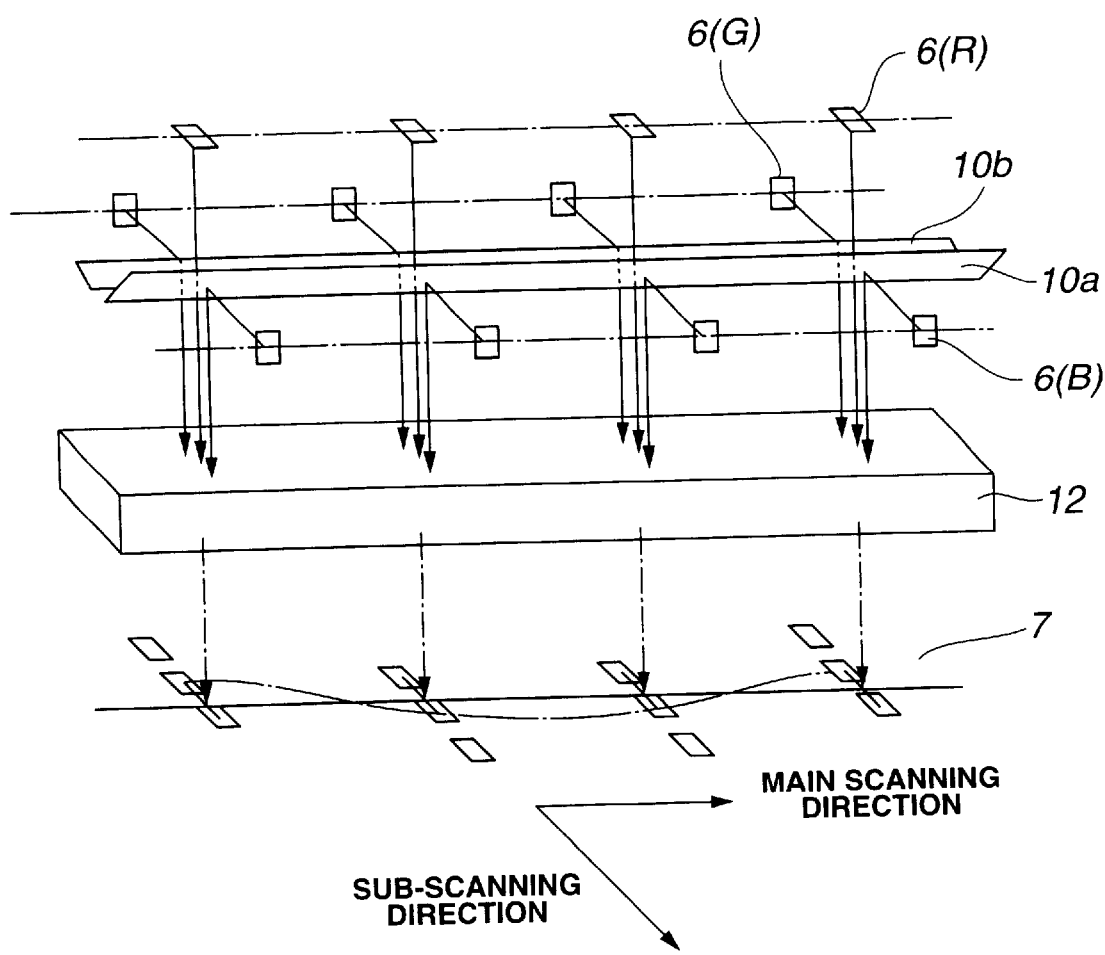
FIG. 4 is a perspective view showing functions of the optical printer heads shown in each of FIGS. 2 and 3.
Figure 5:
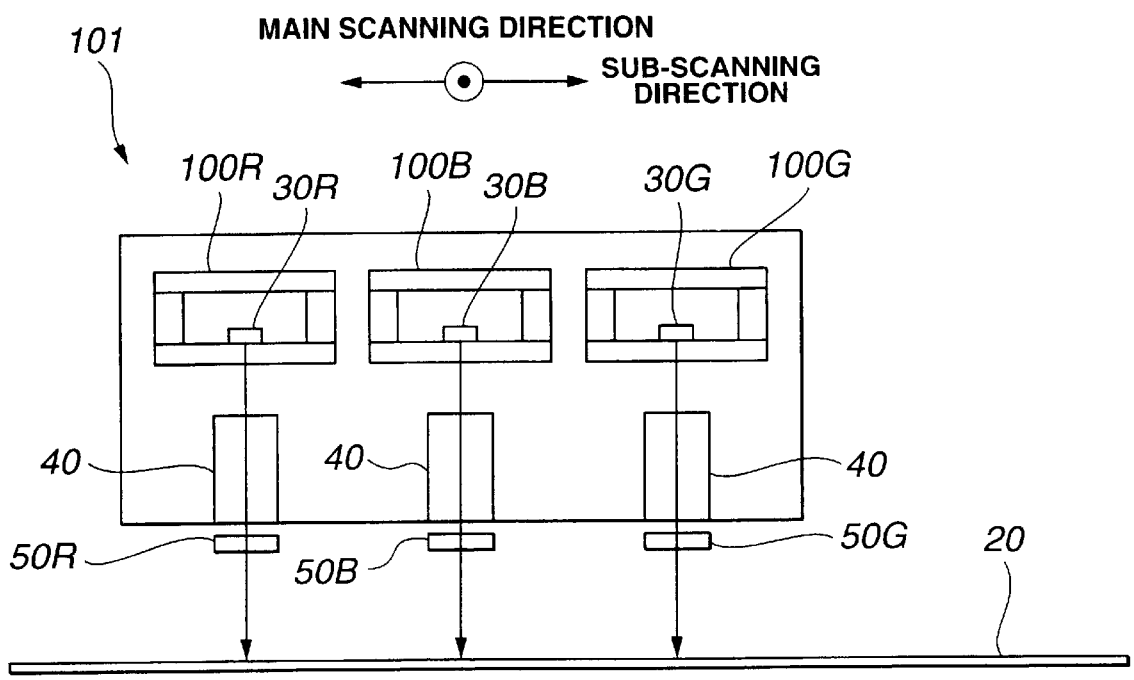
FIG. 5 is a schematic view showing a conventional optical printer head by way of example.
Figure 6:
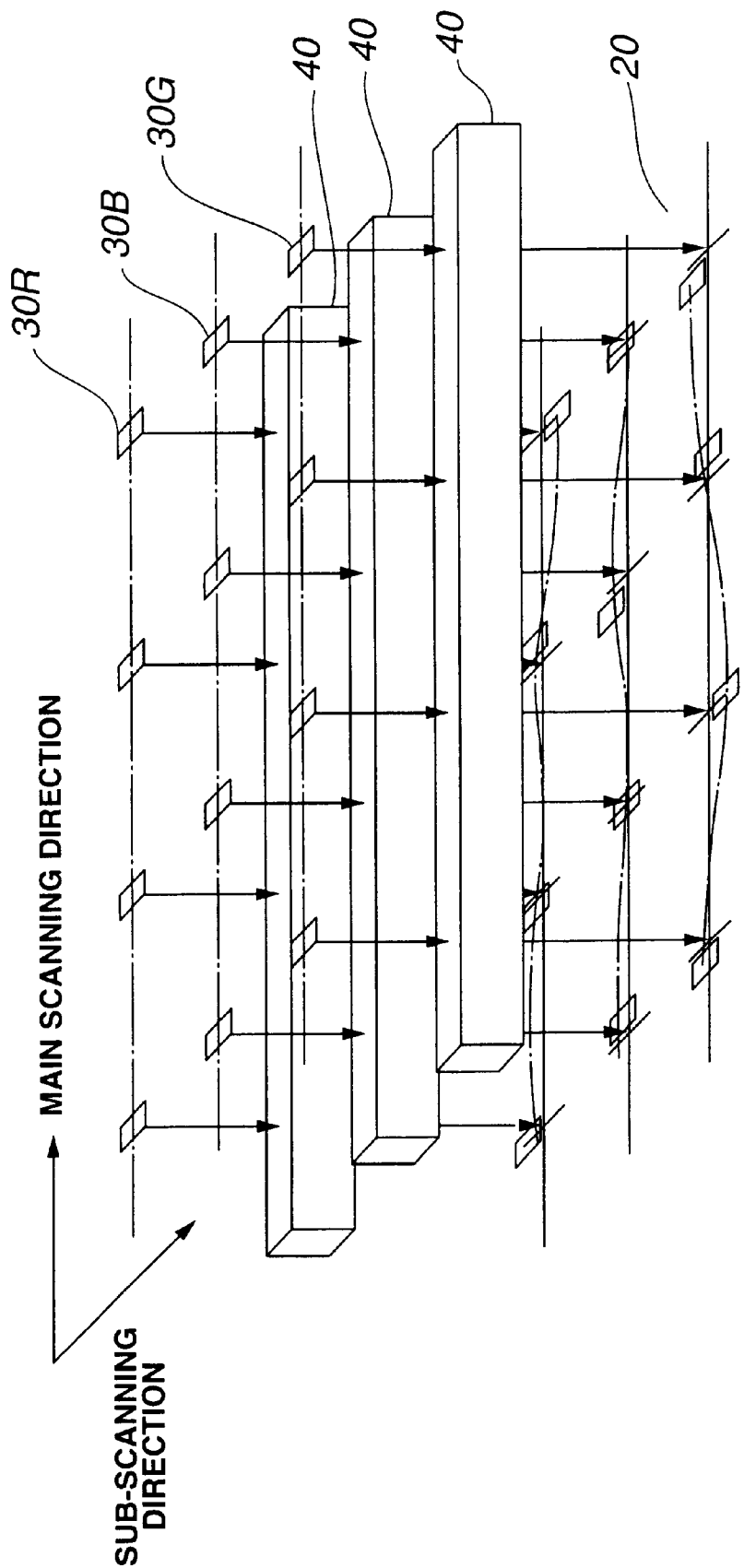
FIG. 6 is a perspective view showing disadvantages of the conventional optical printer head of FIG. 5.

Now, the manner of function of each of the second and third embodiments described above will be described with reference to FIG. 4. The embodiments is constructed so as to permit the lights from the fluorescent luminous tubes 1, 2 and 13 to be incident on the common equi-magnification image formation element 12 through the optical element 10 or 15 such as a dichroic mirror, leading to image formation on the record medium. Thus, even when there occurs any variation in properties of the equi-magnification image formation element 12 depending on the element 12, positional relationship among the dot-like lights for forming the image without being superposed on each other is rendered constant irrespective of such variation in properties of the element 12 as shown in FIG. 4. Thus, images free of any color shift may be satisfactorily accomplished by merely synchronizing luminous driving of the fluorescent luminous tubes and driving of the printer head with each other.

The embodiments described above each may be applied to an optical printer head wherein a fluorescent luminous tube is used as each of light sources therefor. Such an optical printer head may be used as a write head for a fluorescent printer such as a color printer or the like.

In each of the embodiments described above, the dichroic element 10 or 15 selectively carries out reflection and transmission of R, G and B light components of the light depending on a wavelength of the light, so that it does not basically require a color filter or optical filter. However, it often causes leakage of light at a wavelength other than the selected wavelength; therefore, when it is desired to increase purity of a color photosensitized, use of a color filter is effective. For example, when a developing paper is exposed to light, photosensitive regions for R, G and B colors of the developing paper may be at wavelengths of 580 to 750 nm, 500 to 580 nm and 350 to 500 nm by way of example, respectively. Thus, the color filter is effectively used when light separation is carried out near boundary wavelengths of 580 nm and 580 nm among the colors. The color filters effective for color separation at the wavelengths described above may be commercially available under tradenames R:SC 42, G:BPM 53 and B:BPN 45 from Fuji Photo Film Co., Ltd.

The second embodiment described above may be modified so as to combine any one of the first and second fluorescent luminous tube 1 and 2 with the third fluorescent luminous tube 3. Such modification may be carried out in a manner like that in the second or third embodiment described above.

Also, in each of the embodiments described above, the optical element is constructed in a block-like structure. Alternatively, it may be formed into a plate-like configuration.

Further, in each of the above-described embodiment, the dichroic optical element is formed into a prism-like configuration. Alternatively, it may be constructed into a filter-like structure (dichroic filter).

A dichroic filter is in the category of a non-metallic interference filter and functions to reflect a portion of visible light at a selected wavelength and permit the remaining light to permeate therethrough. The details are described in Color Science Handbook, pp.783–860, edited by Color Society of Japan and published by the Tokyo University.

Further, in each of the above-described embodiments, the fluorescent luminous tube having a ZnO:Zn phosphor which has a wide luminous spectrum and exhibits a luminous color between a blue region and a red region incorporated therein and that having a (Zn,Cd)S phosphor which exhibits a red luminous color incorporated therein are used as the light sources. Alternatively, monochromatic light sources respectively exhibiting blue, green and red luminous colors may be used to this end. In addition, a light source which exhibits any two of blue, green and red luminous colors, a light source of a white color which exhibits three luminous colors or a combination thereof may be likewise used for this purpose.

Also, in each of the embodiments described above, the fluorescent luminous tubes are used as the light sources. Alternatively, any other suitable luminous element such as a field-emission type luminous element, a light emitting diode, a plasma display panel, an inorganic or organic electroluminescent element, a combination of a liquid crystal shutter and a back light, a combination of a PLZT shutter and a back light, or the like may be used to this end. Also, any combination of such light sources may be used as a composite light source.

In each of the embodiments, the selfoc lens array is used as the equi-magnification image formation element. Alternatively, a plastic lens array, a roof mirror lens array or the like may be used for this purpose.

The optical printer head of each of the above-described embodiments is so constructed that dot-like lights different in luminous color emitted from the plural fluorescent luminous tubes are guided to the common equi-magnification image formation element through the dichroic optical element while being kept from being aligned or coincident with each other, resulting in an image being formed on the record medium while being arranged in fixed positional relationship thereon. Also, the optical members may be incorporated in the optical printer head, so that the optical path lengths of the dot-like lights different in luminous color emitted from the light sources may be rendered substantially equal to each other. Such construction provides a distinct image free of color shift and color fading.

As can be seen form the foregoing, in the present invention, the single optical element or lens is provided so as to be common to the plural light sources, leading to down-sizing of the whole optical printer head. Also, when lights emitted from the plural light sources are incident on the single optical element or lens, the lights travel on the same optical path for synthesis. This eliminates such a misregistration between dot-like lights as encountered with the prior art even when the optical element or lens has optical distortion, resulting in a distinct image being obtained.

Also, the present invention is constructed so as to optically synthesize lights emitted from the plural light sources, to thereby facilitate positional alignment of the dot-like lights, resulting in the number of the optical elements or lens incorporated being reduced, leading to a reduction in manufacturing cost of the optical printer head. Further, this permits the plural light sources different in luminous color to be compactly arranged, to thereby reduce a delay treatment of a data circuit and a head transfer space, unlike the prior art wherein the light sources are arranged spatially apart from each other.

While preferred embodiments of the present invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An optical printer head comprising:
   a plurality of light sources;
   an optical element configured to reflect lights emitted from each of said light sources in a predetermined direction;
   an image formation element configured to receive the lights reflected from said optical element and to project luminous patterns onto a record medium while keeping the luminous fluxes emitted from each of said light sources spaced in parallel; and
   optical members arranged in proximity to said optical element so as to permit optical path lengths of the lights of said light sources in said optical element to be substantially equal to each other,
   wherein said image formation element comprises an equi-magnification optical lens and said optical element comprises a total reflection mirror configured to reflect the lights emitted from said light sources or a dichroic mirror configured to reflect a specific wavelength of the lights emitted from said light sources.

2. An optical printer head as defined in claim 1, wherein said light sources include at least two light sources selected from the group consisting of a first light source configured to emit light in a first direction, a second light source configured to emit light in a second direction opposite to said first direction, and a third light source configured to emit light in a third direction perpendicular to said first and second directions.

3. An optical printer head as defined in claim 1, further comprising a light absorbing member arranged in proximity to said optical element so as to absorb light other than the lights introduced from said light sources into said optical element.

4. An optical printer head as defined in claim 1, wherein at least one of said light sources is combined with an optical filter.

5. An optical printer head as defined in claim 1, wherein said light sources each are a monochromatic light source constituted by a combination of an optical filter and a fluorescent luminous tube.

6. An optical printer head as defined in claim 1, wherein said light sources each exhibit at least one different luminous color.

* * * * *